(12) United States Patent
Inoue

(10) Patent No.: US 11,712,960 B2
(45) Date of Patent: Aug. 1, 2023

(54) VEHICLE CONTROL APPARATUS

(71) Applicant: SUBARU CORPORATION, Tokyo (JP)

(72) Inventor: Satoshi Inoue, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/690,407

(22) Filed: Mar. 9, 2022

(65) Prior Publication Data
US 2022/0305901 A1   Sep. 29, 2022

(30) Foreign Application Priority Data

Mar. 26, 2021 (JP) .................. 2021-052667

(51) Int. Cl.
*B60W 10/08* (2006.01)
*B60K 6/52* (2007.10)
(Continued)

(52) U.S. Cl.
CPC ............. *B60K 6/52* (2013.01); *B60K 6/387* (2013.01); *B60K 6/445* (2013.01); *B60K 6/547* (2013.01); *B60W 10/02* (2013.01); *B60W 10/08* (2013.01); *B60W 10/119* (2013.01); *B60W 20/14* (2016.01); *B60K 6/365* (2013.01); *B60W 2510/244* (2013.01); *B60W 2520/10* (2013.01);
(Continued)

(58) Field of Classification Search
CPC .......... B60K 6/52; B60K 6/387; B60K 6/445; B60K 6/547; B60K 6/365; B60W 2510/244; B60W 2520/10; B60W 2710/021; B60W 2710/1005; B60W 10/02; B60W 10/08; B60W 10/119; B60W 20/13; B60W 20/14; B60W 30/18127
USPC .............................................. 477/5
See application file for complete search history.

(56) References Cited

U.S. PATENT DOCUMENTS 5,547,433 A * 8/1996 Yang ................. B60W 20/00
903/951
11,639,094 B2 * 5/2023 Haka .................... B60K 6/52
475/5

(Continued)

FOREIGN PATENT DOCUMENTS

JP   2000-043696 A    2/2000
JP   2007-244111 A    9/2007
JP   2020-168971 A   10/2020

*Primary Examiner* — Roger L Pang
(74) *Attorney, Agent, or Firm* — McDermott Will & Emery LLP

(57) ABSTRACT

A vehicle control apparatus includes a planetary gear mechanism, first and second wheels, an engine, a motor generator, a wheel drive clutch, and a control system. The planetary gear mechanism includes first, second, and third rotation elements. The first wheel is coupled to the first rotation element via a first path. The second wheel is coupled to the second rotation element via a second path. The engine is coupled to the third rotation element via a third path. The motor generator is provided on the first path. The wheel drive clutch is provided on the first path and between the motor generator and the first wheel. The control system controls the motor generator and the wheel drive clutch. The control system executes a motor stop mode in which the wheel drive clutch is brought into a released state and the motor generator is brought into a rotation stop state.

5 Claims, 16 Drawing Sheets

(51) Int. Cl.
  *B60K 6/387*  (2007.10)
  *B60K 6/445*  (2007.10)
  *B60K 6/547*  (2007.10)
  *B60W 20/14*  (2016.01)
  *B60W 10/119* (2012.01)
  *B60W 10/02*  (2006.01)
  *B60K 6/365*  (2007.10)

(52) U.S. Cl.
  CPC ............... *B60W 2710/021* (2013.01); *B60W 2710/1005* (2013.01)

(56) References Cited

U.S. PATENT DOCUMENTS

2003/0195075 A1* 10/2003 Bowen ................. B60W 10/10
  903/910
2005/0035601 A1*  2/2005 Dyck .................... B60K 6/365
  903/946
2009/0255746 A1* 10/2009 Boesch ............. B60K 17/3462
  180/197
2021/0188249 A1*  6/2021 Kawashiri ............ B60W 10/08
2023/0011741 A1*  1/2023 Tatekawa ............... B60K 6/445

* cited by examiner

ALL-WHEEL DRIVE MODE/ ALL-WHEEL REGENERATION MODE

FRONT-WHEEL REGENERATION MODE

SOC ≤ S1, FRONT-WHEEL REGENERATION MODE

SOC ≤ S1, ALL-WHEEL REGENERATION MODE

VEHICLE SPEED > V1, MOTOR STOP MODE

VEHICLE SPEED > V1, MOTOR STOP MODE

MOTOR STOP MODE

ALL-WHEEL DRIVE MODE

VEHICLE CONTROL APPARATUS

CROSS-REFERENCE TO RELATED APPLICATIONS

The present application claims priority from Japanese Patent Application No. 2021-052667 filed on Mar. 26, 2021, the entire contents of which are hereby incorporated by reference.

BACKGROUND

The technology relates to a vehicle control apparatus that controls a vehicle.

Hybrid vehicles including an engine and a motor generator as power sources have been developed. Reference are made to Japanese Unexamined Patent Application Publication (JP-A) Nos. 2000-43696, 2007-244111, and 2020-168971. Additionally, all-wheel drive hybrid vehicles have been developed that drive both the front wheels and the rear wheels.

SUMMARY

An aspect of the technology provides a vehicle control apparatus. The vehicle control apparatus is configured to control a vehicle. The vehicle control apparatus includes a planetary gear mechanism, a first wheel, a second wheel, an engine, a motor generator, a wheel drive clutch, and a control system. The planetary gear mechanism includes a first rotation element, a second rotation element, and a third rotation element. The first wheel is coupled to the first rotation element via a first path. The second wheel is coupled to the second rotation element via a second path. The engine is coupled to the third rotation element via a third path. The motor generator is provided on the first path. The wheel drive clutch is provided on the first path and between the motor generator and the first wheel. The control system includes a processor and a memory communicably coupled to each other. The control system is configured to control the motor generator and the wheel drive clutch. The control system is configured to execute a motor stop mode in which the wheel drive clutch is brought into a released state and the motor generator is brought into a rotation stop state.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
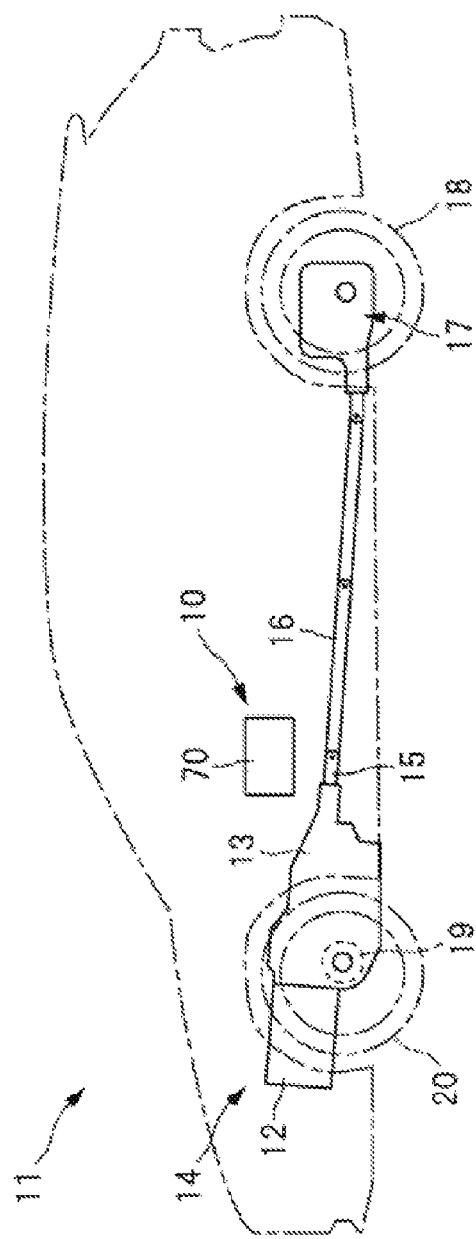
FIG. 1 is a diagram illustrating an exemplary configuration of a vehicle including a vehicle control apparatus according to an example embodiment of the technology.

All-wheel drive vehicles, which drive both the front wheels and the rear wheels, have complicated driving paths including rotary shafts and gears. The all-wheel drive vehicles thus can experience large energy losses in the driving paths. Therefore, it has been desired to enhance the energy efficiency of vehicles by reducing the energy losses in the driving paths.

It is desirable to provide a traveling control apparatus that enhances the energy efficiency of the vehicle.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

Exemplary Overall Configuration of Vehicle Control Apparatus

FIG. 1 illustrates an exemplary configuration of a vehicle 11 including a vehicle control apparatus 10 according to an example embodiment of the technology. As illustrated in FIG. 1, the vehicle 11 may include a power unit 14 including an engine 12 and a transmission 13. The power unit 14 may have an output shaft 15 to which a rear wheel 18 is coupled via a propeller shaft 16 and a rear drive unit 17. In the transmission 13, a front differential 19 may be incorporated. To the front differential 19, a front wheel 20 is coupled.

Figure 2:
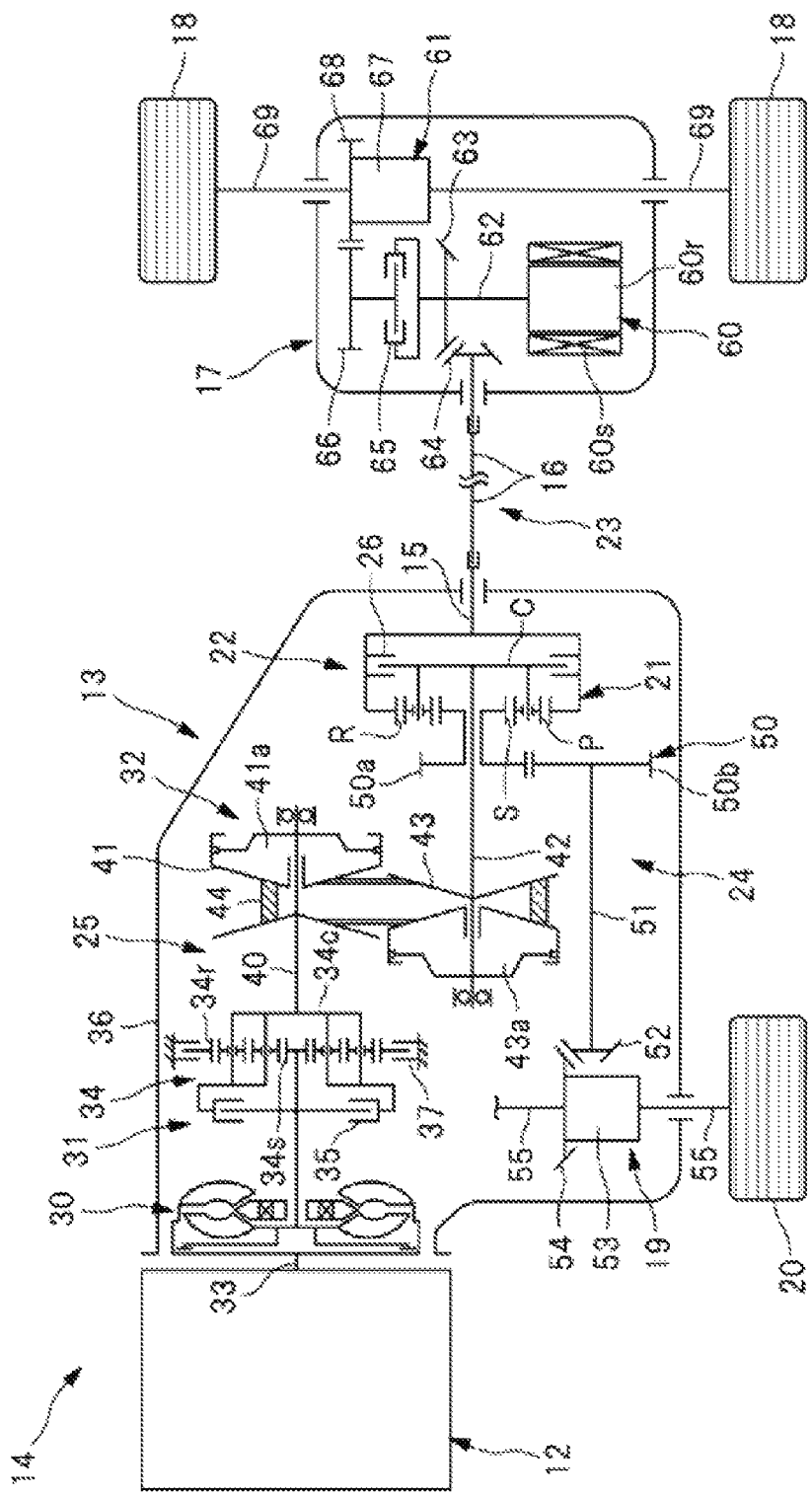
FIG. 2 is a diagram illustrating exemplary configurations of a power unit and a rear drive unit.

FIG. 2 illustrates exemplary configurations of the power unit 14 and the rear drive unit 17. As illustrated in FIG. 2, the power unit 14 may include a center differential 22 that includes a planetary gear mechanism 21. To the center differential 22, the rear wheel 18 may be coupled via a rear-wheel drive path 23, and the front wheel 20 may be coupled via a front-wheel drive path 24. Additionally, to the center differential 22, the engine 12 may be coupled via a power transmission path 25. That is, the engine 12, the front wheels 20, and the rear wheels 18 may be coupled to one another via the center differential 22.

Power Unit

An exemplary configuration of the power unit 14 will now be described. As described above, the power unit 14 may include the center differential 22 that includes the planetary gear mechanism 21. The planetary gear mechanism 21 may include a ring gear R, which is also referred to as an internal gear, a carrier C, and a sun gear S. The carrier C may rotatably support a pinion P engaging with the ring gear R. The sun gear S may engage with the pinion P. The center differential 22 may further include a differential limiting clutch 26 that engages the ring gear R and the carrier C with each other.

To the ring gear R of the center differential 22, the rear wheel 18 is coupled via the rear-wheel drive path 23. In one embodiment, the ring gear R may serve as a "first rotation element". In one embodiment, the rear wheel 18 may serve as a "first wheel". In one embodiment, the rear-wheel drive path 23 may serve as a "first path". To the sun gear S of the center differential 22, the front wheel 20 is coupled via the front-wheel drive path 24. In one embodiment, the sun gear S may serve as a "second rotation element". In one embodiment, the front wheel 20 may serve as a "second wheel". In one embodiment, the front-wheel drive path 24 may serve as a "second path". Further, to the carrier C of the center differential 22, the engine 12 is coupled via the power transmission path 25. In one embodiment, the carrier C may serve as a "third rotation element". In one embodiment, the power transmission path 25 may serve as a "third path".

Between the engine 12 and the center differential 22, a torque converter 30, a forward/backward switching mechanism 31, and a transmission mechanism 32 may be provided. In other words, the engine 12 may be coupled to the center differential 22 via the power transmission path 25 including the torque converter 30, the forward/backward switching mechanism 31, and the transmission mechanism 32. The torque converter 30 may be coupled to a crankshaft 33 of the engine 12. To the torque converter 30, the forward/backward switching mechanism 31 may be coupled. The forward/backward switching mechanism 31 may switch the rotational direction of a carrier 34c. The forward/backward switching mechanism 31 may include a double-pinion planetary gear train 34, a forward clutch 35, and a reverse brake 37. The forward clutch 35 may engage a sun gear 34s and the carrier 34c of the planetary gear train 34 with each other. The reverse brake 37 may fix a ring gear 34r of the planetary gear train 34 to a transmission case 36.

To move the vehicle 11 forward, the forward clutch 35 may be engaged to release the reverse brake 37. This causes the sun gear 34s at the input side and the carrier 34c at the output side to rotate in the same direction, rotating the transmission mechanism 32 in such a direction that causes the vehicle 11 to move forward. In contrast, to move the vehicle 11 backward, the reverse brake 37 may be engaged to release the forward clutch 35. This causes the sun gear 34s at the input side and the carrier 34c at the output side to rotate in reverse to each other, rotating the transmission mechanism in such a direction that causes the vehicle 11 to move backward.

The transmission mechanism 32 may include a primary pulley 41 supported by a primary shaft 40, and a secondary pulley 43 supported by a secondary shaft 42. The primary pulley 41 may include a primary oil chamber 41a, and the secondary pulley 43 may include a secondary oil chamber 43a. Around the primary pulley 41 and the secondary pulley 43, a drive chain 44 may extend. The transmission mechanism 32 may change the winding diameter of the drive chain 44 by adjusting the hydraulic pressure in the primary oil chamber 41a and the secondary oil chamber 43a. This enables continuously variable shifting from the primary shaft 40 to the secondary shaft 42. To the secondary shaft 42 of the transmission mechanism 32, the carrier C, which is an input element of the center differential 22, may be coupled.

Between the center differential 22 and the front wheel 20, a gear train 50 and a front differential 19 may be provided. In other words, the center differential 22 may be coupled to the front wheel 20 via the front-wheel drive path 24 including the gear train 50 and the front differential 19. The sun gear S, which is an output element of the center differential 22, may be coupled to a driving gear 50a. The driving gear 50a may engage with a driven gear 50b to which a front-wheel drive shaft 51 is coupled. The front-wheel drive shaft 51 may have an end provided with a pinion 52 that engages with a bevel gear 54. The bevel gear 54 may be fixed to a differential case 53 of the front differential 19. From the front differential 19, a front shaft 55 may extend and be coupled to the front wheel 20. Note that the pinion 52 and the bevel gear 54 engaging with each other may each include a spiral bevel gear with helical teeth or a hypoid gear (registered trademark).

Rear Drive Unit

An exemplary configuration of the rear drive unit 17 will now be described. The output shaft 15 coupled to the ring gear R, which is an output element of the center differential 22, i.e., the output shaft 15 of the power unit 14 may be coupled to the rear drive unit 17 via the propeller shaft 16. In the rear drive unit 17, a motor generator 60 and a rear differential 61 may be incorporated. The motor generator 60 may have a rotor shaft 62 provided with a bevel gear 63. The bevel gear 63 may engage with a pinion 64 coupled to the propeller shaft 16. Note that the pinion 64 and the bevel gear 63 engaging with each other may each include a spiral bevel gear with helical teeth or a hypoid gear (registered trademark). To the rotor shaft 62 of the motor generator 60, a driving gear 66 may be coupled via a rear clutch 65. In one embodiment, the rear clutch 65 may serve as a "wheel drive clutch". The driving gear 66 may engage with a driven gear 68 fixed to a differential case 67 of the rear differential 61. From the rear differential 61, a rear shaft 69 may extend and be coupled to the rear wheel 18.

As described above, the center differential 22 may be coupled to the rear wheel 18 via the rear-wheel drive path 23 including the propeller shaft 16 and the rear drive unit 17. The rear-wheel drive path 23 coupling the center differential and the rear wheel 18 may be provided with the motor generator 60 and the rear clutch 65. The rear clutch 65 may be provided between the motor generator 60 and the rear wheel 18. Releasing the rear clutch 65 separates the rear wheel 18 from the pinion shaft and the rotor shaft 62, and separates the engine 12 and the motor generator 60 from the rear wheel 18. In contrast, engaging the rear clutch 65 couples the pinion shaft and the rotor shaft 62 to the rear wheel 18, and couples the rear wheel 18 to the engine 12 and the motor generator 60.

Control System

Figure 3:
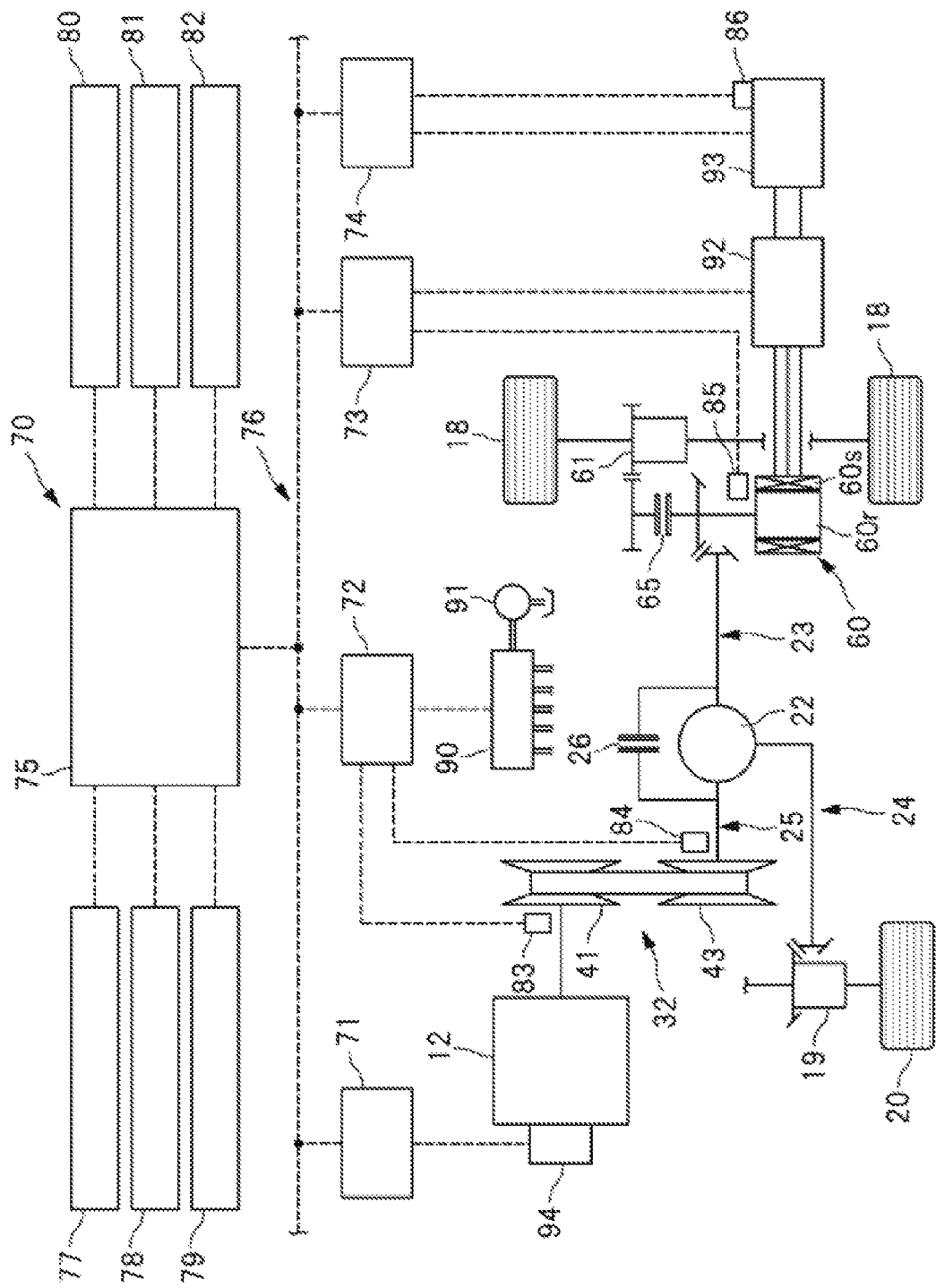
FIG. 3 is a diagram illustrating examples of the power unit, the rear drive unit, and a control system.

FIG. 3 illustrates examples of the power unit 14, the rear drive unit 17, and a control system 70. As illustrated in FIG. 3, the vehicle control apparatus 10 may include the control system 70 including a plurality of electronic control units that control the power unit 14, the rear drive unit 17, and other components. Examples of the electronic control units of the control system 70 may include an engine control unit (ECU) 71, a transmission control unit (TCU) 72, a motor control unit (MCU) 73, a battery control unit (BCU) 74, and a vehicle control unit (VCU) 75. The VCU 75 may output control signals to these control units 71 to 74.

These control units 71 to 75 may be communicably coupled to one another via an in-vehicle network such as a controller area network (CAN) or a local interconnect network (LIN). The VCU 75 may set operation target values of the engine 12, the motor generator 60, the transmission mechanism 32, the differential limiting clutch 26, and the rear clutch 65 on the basis of input data received from the control units 71 to 74 and various sensors described below. The VCU 75 may then generate control signals based on the operation target values of the engine 12, the motor generator 60, and so forth, and output the control signals to the control units 71 to 74.

Examples of the sensors coupled to the VCU 75 may include a vehicle speed sensor 77, an acceleration sensor 78, a brake sensor 79, a wheel speed sensor 80, a steering angle sensor 81, and a start switch 82. The vehicle speed sensor 77 may detect the traveling speed of the vehicle 11 (hereinafter also referred to as vehicle speed). The acceleration sensor 78 may detect the operation amount of the accelerator pedal (hereinafter also referred to as accelerator position). The brake sensor 79 may detect the operation amount of the brake pedal. The wheel speed sensor 80 may detect the rotation speeds of the front wheels 20 and the rear wheels 18. The steering angle sensor 81 may detect the steering wheel angle of the steering wheel operated by a driver who drives the vehicle 11. The start switch 82 may be operated by the driver to start the control system 70.

Examples of the sensors coupled to the TCU 72 may include a primary rotation sensor 83, a secondary rotation sensor 84, and a motor speed sensor 85. The primary rotation sensor 83 may detect the rotation speed of the primary pulley 41. The secondary rotation sensor 84 may detect the rotation speed of the secondary pulley 43. The motor speed sensor 85 may detect the rotation speed of a rotor 60*r* of the motor generator 60 (hereinafter also referred to as motor rotation speed). Examples of the sensors coupled to the BCU 74 may include a battery sensor 86. The battery sensor 86 may detect the charging/discharging current, the terminal voltage, and the temperature of a battery 93 described below.

The vehicle 11 may further include a valve unit 90 including magnetic valves, oil passages, and so forth. The valve unit 90 may control the forward/backward switching mechanism 31, the transmission mechanism 32, the differential limiting clutch 26, the rear clutch 65 and other hydraulic devices. To the valve unit 90, an oil pump 91 may be coupled. The oil pump 91 may be driven by the engine 12, for example. The destination and the pressure of the hydraulic oil discharged from the oil pump 91 may be controlled by the valve unit 90 so that the hydraulic oil is supplied to the hydraulic devices including the differential limiting clutch 26 and the rear clutch 65. The TCU 72 may output a control signal to the valve unit 90 to control the hydraulic devices including the differential limiting clutch 26 and the rear clutch 65 via the valve unit 90.

The motor generator 60 may include a stator 60*s* to which a battery 93 is coupled via an inverter 92. The battery 93 may be a lithium-ion battery, for example. In one embodiment, the battery 93 may serve as a "power storage device". The MCU 73 may control the motor generator 60. The MCU 73 may output a control signal to the inverter 92, which is an electric power converter. The BCU 74 may monitor the state of charge/discharge of the battery 93. For example, the BCU 74 may calculate the state of charge (SOC) of the battery 93 on the basis of the charging/discharging current detected by the battery sensor 86. The SOC of the battery 93 may be defined as the ratio indicating the remaining amount of electricity in the battery 93, i.e., the ratio of the amount of electricity stored in the battery 93 to the full charge capacity of the battery 93. For example, the SOC may be calculated to be 100% when the battery 93 is charged to the upper limit capacity, and 0% when the battery 93 is discharged to the lower limit capacity. The ECU 71 may control the engine 12. For example, the ECU 71 may output a control signal to an auxiliary device 94 including a throttle valve and an injector.

Figure 4:
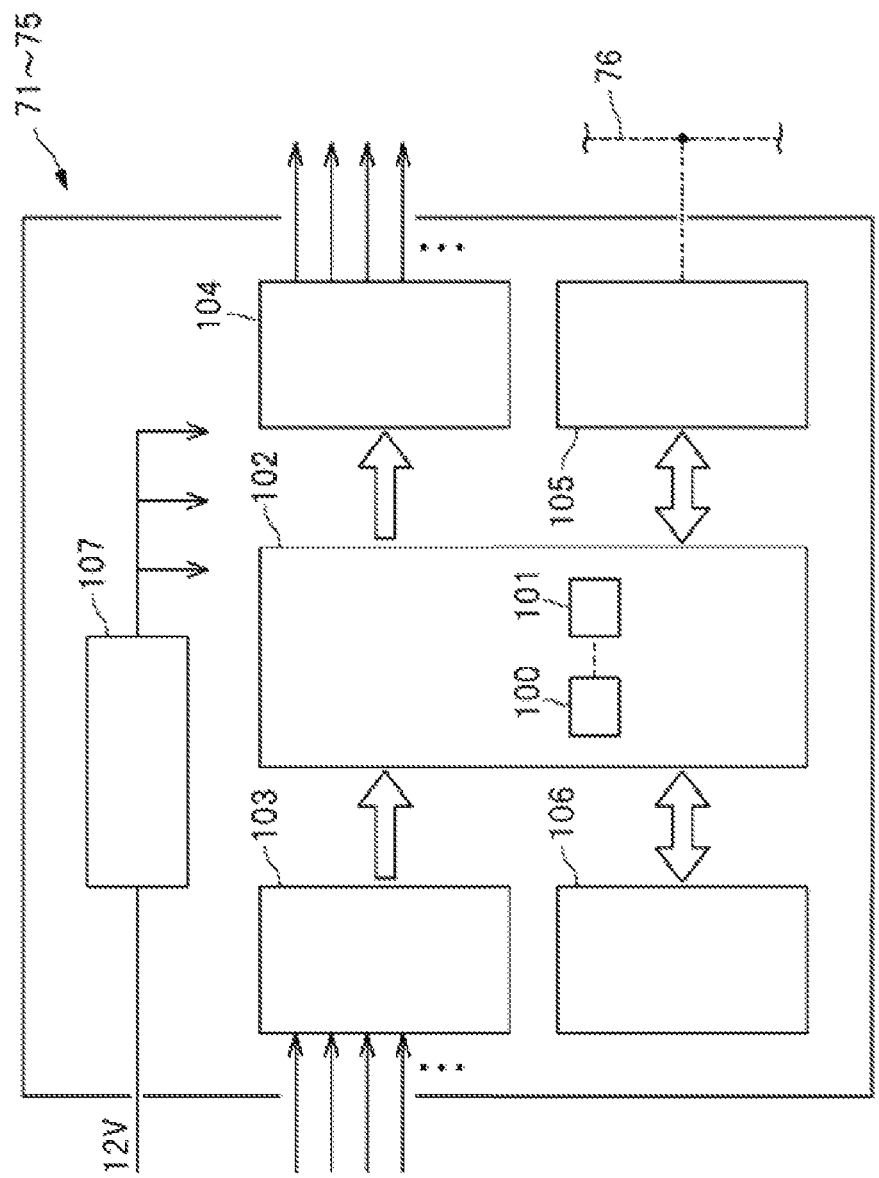
FIG. 4 is a diagram simply illustrating exemplary basic structures of control units.

FIG. 4 illustrates exemplary basic structures of the control units 71 to 75. As illustrated in FIG. 4, the control units 71 to 75 may each include a microcontroller 102. In the microcontroller 102, a processor 100 and a memory 101 may be incorporated. The memory 101 may store a predetermined program, and the processor 100 may execute a command set for the program. The processor 100 and the memory 101 may be communicably coupled to each other. Although the microcontroller 102 may include the single processor 100 and the single memory 101 in the example illustrated in FIG. 4, this example is not restrictive. Alternatively, the microcontroller 102 may include a plurality of processors 100 or a plurality of memories 101.

The control units 71 to 75 may each include circuitry including an input conversion circuit 103, a drive circuit 104, a communication circuit 105, an external memory 106, and a power circuit 107. The input conversion circuit 103 may convert signals received from the sensors into signals receivable by the microcontroller 102. The drive circuit 104 may generate a drive signal for an actuator, such as the valve unit 90 described above, on the basis of the signal received from the microcontroller 102. The communication circuit 105 may convert signals received from the microcontroller 102 into communication signals to be sent to the other control units. The communication circuit 105 may further convert signals received from the other control units into signals receivable by the microcontroller 102. The power circuit 107 may supply a stable power voltage to the microcontroller 102, the input conversion circuit 103, the drive circuit 104, the communication circuit 105, and the external memory 106, for example. The external memory 106 may be, for example, a non-volatile memory, and store data to be held even when not being energized.

Traveling Mode

Figure 5A:
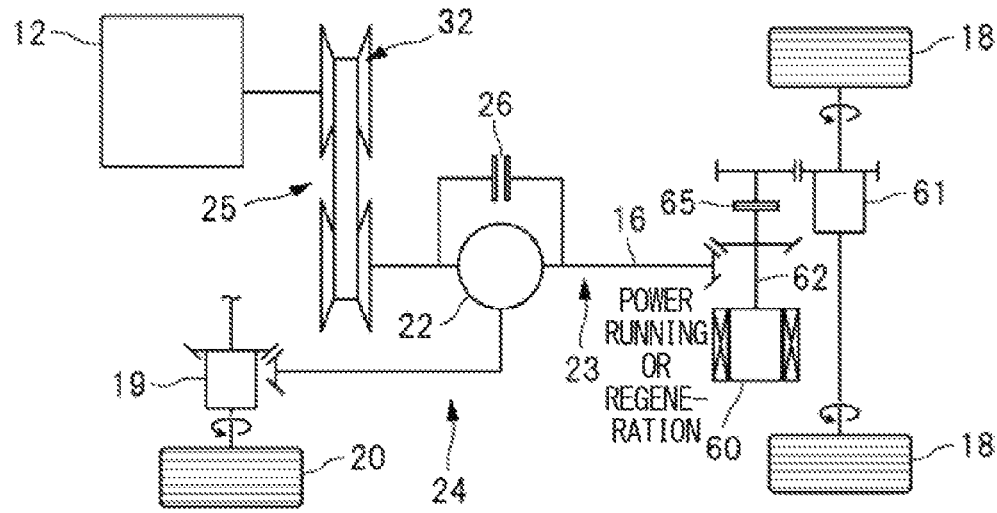
FIG. 5A is a diagram illustrating an exemplary condition in which an all-wheel drive mode or an all-wheel regeneration mode is executed.
Figure 5B:
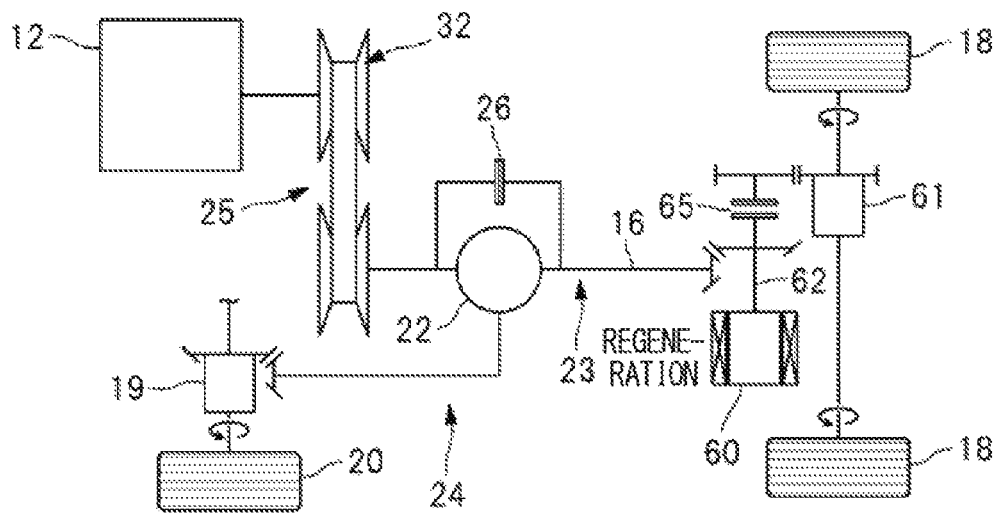
FIG. 5B is a diagram illustrating an exemplary condition in which a front-wheel regeneration mode is executed.
Figure 5C:
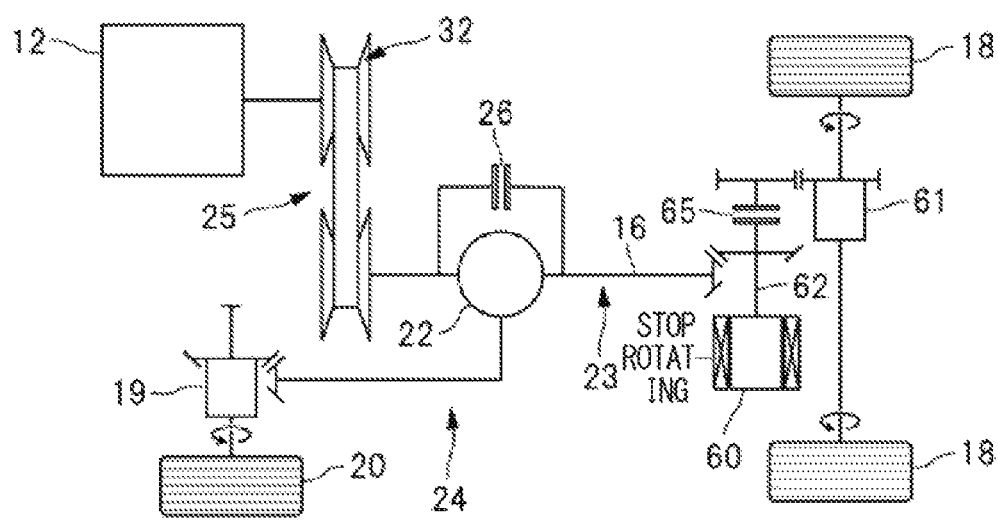
FIG. 5C is a diagram illustrating an exemplary condition in which a motor stop mode is executed.

The traveling modes of the vehicle 11 will now be described. FIG. 5A illustrates an exemplary condition in which an all-wheel drive mode or an all-wheel regeneration mode is executed. FIG. 5B illustrates an exemplary condition in which a front-wheel regeneration mode is executed. FIG. 5C illustrates an exemplary condition in which a motor stop mode is executed. As described below, the control system 70 may cause the vehicle 11 to travel in the all-wheel drive mode, the all-wheel regeneration mode, the front-wheel regeneration mode, or the motor stop mode.

To execute the all-wheel drive mode or the all-wheel regeneration mode, the differential limiting clutch 26 may be brought into a released state, and the rear clutch 65 may be brought into an engaged state, as illustrated in FIG. 5A. This causes the engine 12, the motor generator 60, the front wheels 20, and the rear wheels 18 to be coupled to one another via the center differential 22. That is, in the all-wheel drive mode in which the vehicle 11 is accelerated or caused to travel in a steady state, the differential limiting clutch 26 may be brought into the released state, the rear clutch 65 may be brought into the engaged state, and the motor generator 60 may be brought into the power-running state. This causes the driving power outputted from the engine 12 or the motor generator 60 to be distributed to both the front wheels 20 and the rear wheels 18. Further, in the all-wheel drive mode, the distribution ratio of the driving power between the rear wheels 18 and the front wheels 20 may be freely adjusted by controlling the power-running torque of the motor generator 60. Although the differential limiting clutch 26 is brought into the released state in the example illustrated in FIG. 5A, this example is not restrictive. Alternatively, the differential limiting clutch 26 may be brought into the engaged state.

In the all-wheel regeneration mode in which the vehicle 11 is decelerated, the differential limiting clutch 26 may be brought into the released state, the rear clutch 65 may be brought into the engaged state, and the motor generator 60 may be brought into a regenerative state. This causes the braking force generated in the engine 12 or the motor generator 60 to be distributed to both the front wheels 20 and the rear wheels 18. Further, in the all-wheel regeneration mode, the distribution ratio of the braking force between the rear wheels 18 and the front wheels 20 may be freely adjusted by controlling the regenerative torque of the motor generator 60. Although the differential limiting clutch 26 is brought into the released state in the example illustrated in FIG. 5A, this example is not restrictive. Alternatively, the differential limiting clutch 26 may be brought into the engaged state.

To execute the front-wheel regeneration mode, the differential limiting clutch 26 may be brought into an engaged state, the rear clutch 65 may be bought into a released state, and the motor generator 60 may be brought into the regenerative state, as illustrated in FIG. 5B. This separates the motor generator 60 from the rear wheels 18, and couples the motor generator 60 to the front wheels 20. That is, the motor generator 60 is directly coupled to the front wheels 20 where the braking force easily increases, which largely increases the regenerative torque of the motor generator 60.

Accordingly, it is possible to enhance the energy efficiency of the vehicle 11. In one embodiment, the front-wheel regeneration mode may serve as a "motor regeneration mode".

To execute the motor stop mode, the differential limiting clutch 26 may be brought into the released state, the rear clutch 65 may be brought into the released state, and the motor generator 60 may be brought into the rotation stop state, as illustrated in FIG. 5C. That is, the rear clutch 65 may be brought into the released state to separate the rear wheels from the motor generator 60. Additionally, the differential limiting clutch 26 may be brought into the released state to stop the motor generator 60 while the front wheels 20 are kept rotating. This causes the propeller shaft 16, the pinion 64, the bevel gear 63, and the rotor 60r to stop rotating while the vehicle 11 is traveling. In other words, the rotational resistance of the rear-wheel drive path is reduced. Accordingly, it is possible to enhance the energy efficiency of the vehicle 11. Note that the rotation stop state of the motor generator 60 may refer to a condition in which the motor torque is controlled so that the motor rotation speed is maintained at zero.

Traveling Mode Setting Control 1

Figure 6:
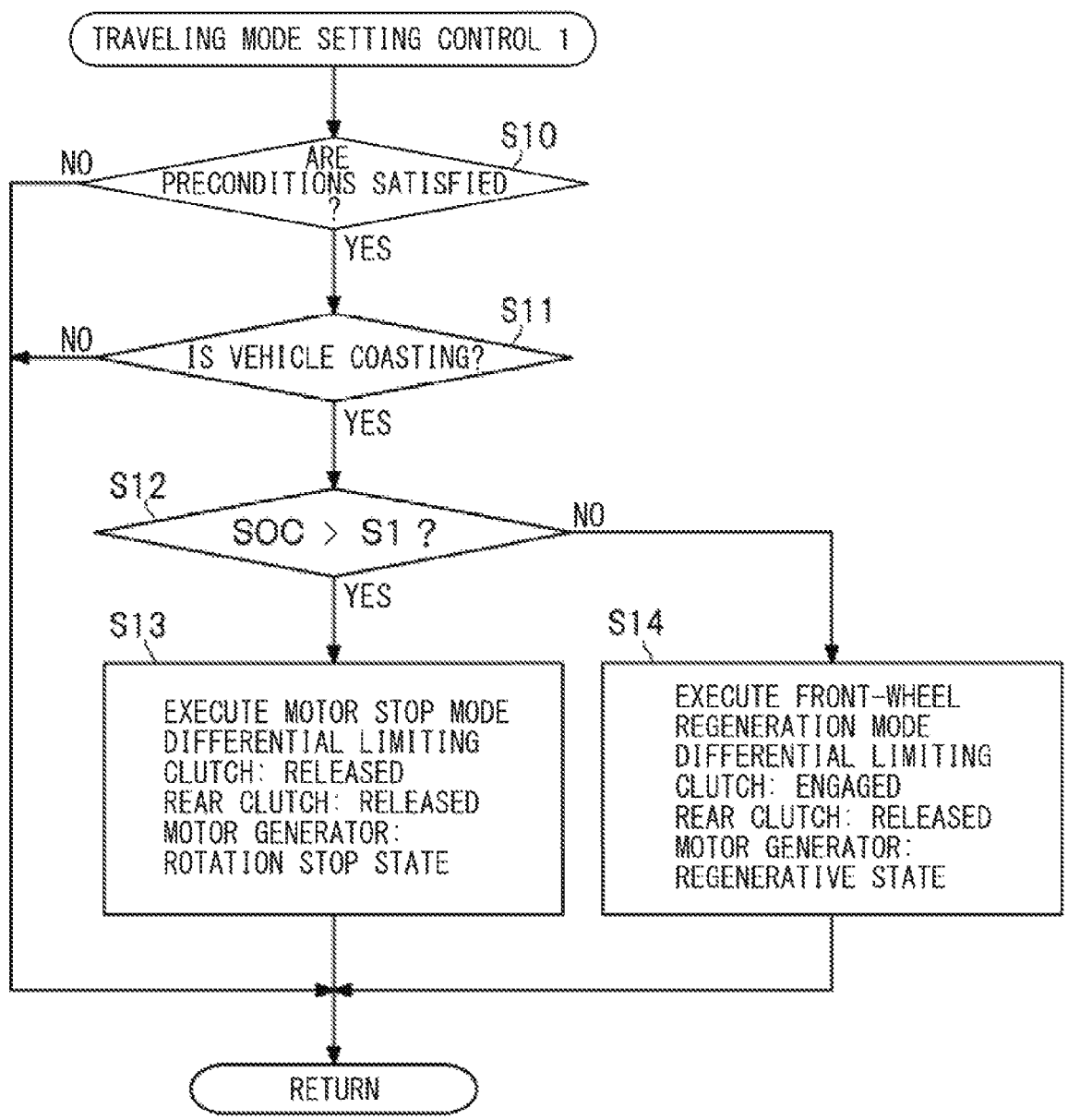
FIG. 6 is a flowchart illustrating an exemplary procedure for traveling mode setting control 1.
Figure 7A:
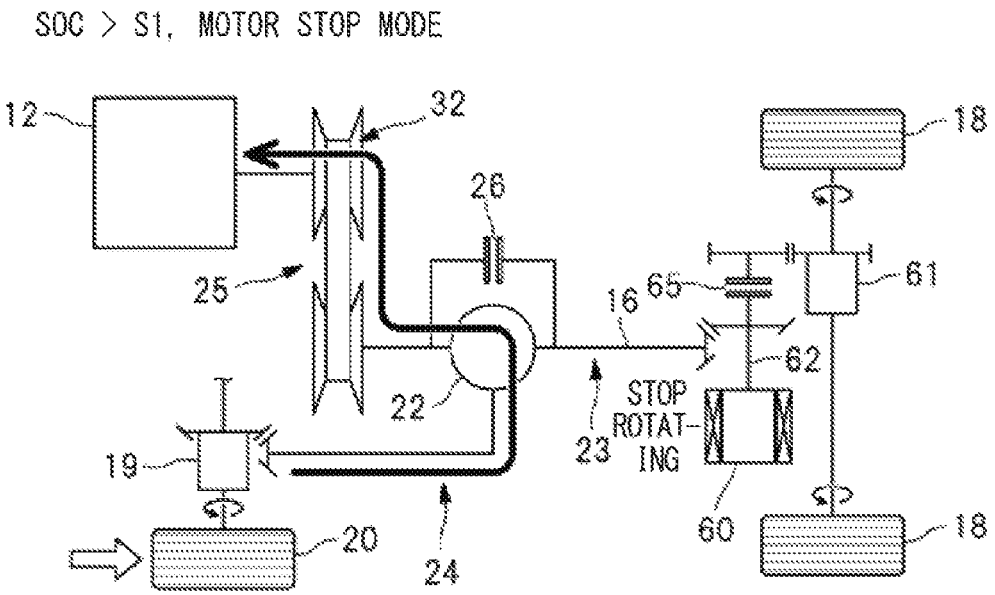
FIG. 7A is a diagram illustrating an exemplary condition in which the motor stop mode is executed while the vehicle is coasting.
Figure 7B:
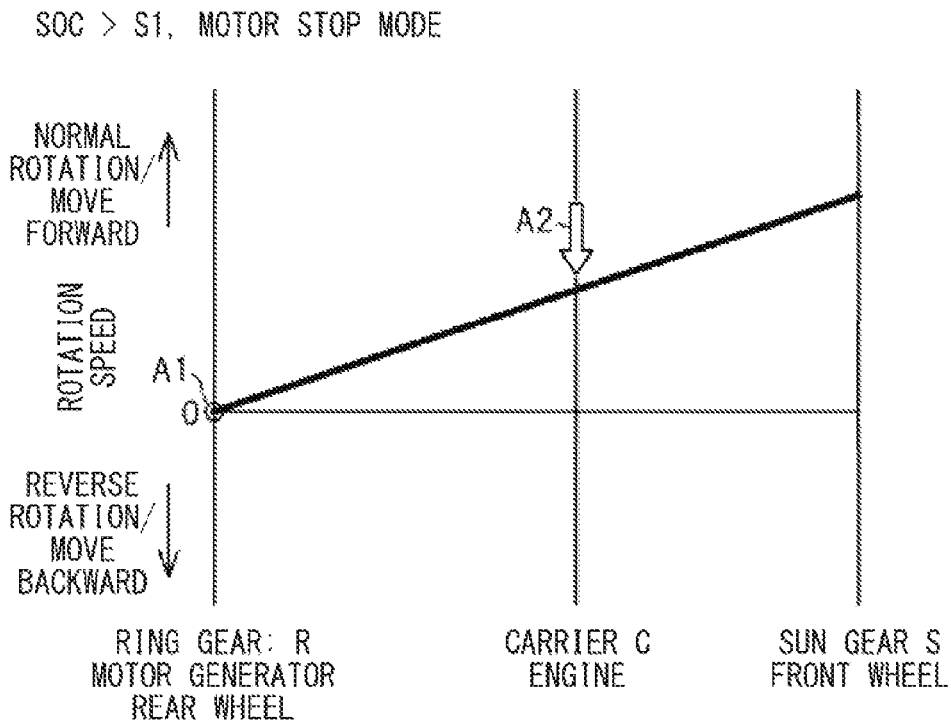
FIG. 7B is a nomographic chart illustrating an exemplary operational state of a center differential illustrated in FIG. 7A.
Figure 8:
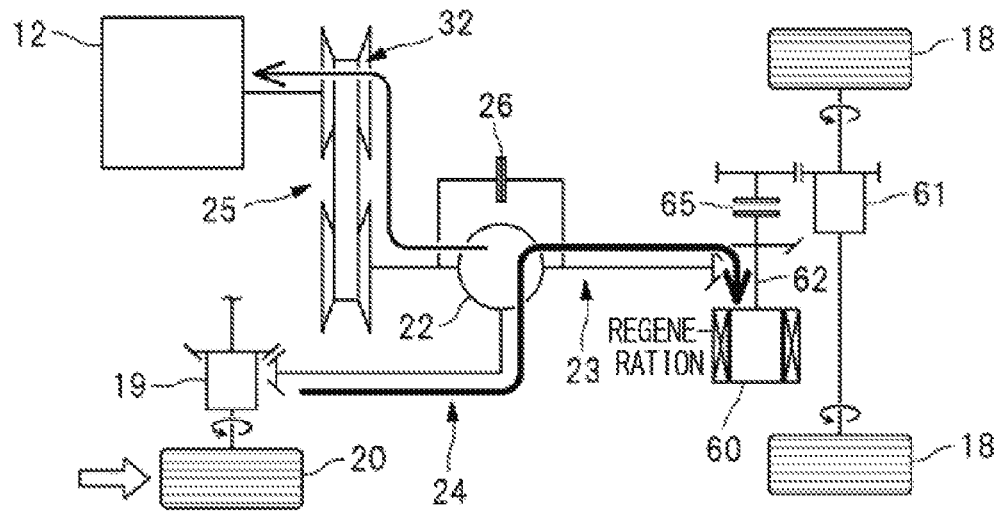
FIG. 8 is a diagram illustrating an exemplary condition in which the front-wheel regeneration mode is executed while the vehicle is coasting.

Traveling mode setting control 1 will now be described. In the traveling mode setting control 1, the traveling mode in which the vehicle 11 is decelerated may be set. FIG. 6 is a flowchart illustrating an exemplary procedure for the traveling mode setting control 1. The steps in the flowchart illustrated in FIG. 6 may be performed by the at least one processor 100 in the control system 70. The traveling mode setting control 1 illustrated in FIG. 6 may be a control process executed by the control system 70 at a predetermined cycle after the control system 70 including the VCU 75 is started in response to a driver's operation on the start switch 82. FIG. 7A illustrates an exemplary condition in which the motor stop mode is executed while the vehicle 11 is coasting, and FIG. 7B is a nomographic chart illustrating an exemplary operational state of the center differential 22 in FIG. 7A. FIG. 8 illustrates an exemplary condition in which the front-wheel regeneration mode is executed while the vehicle 11 is coasting. Note that arrows in the FIGS. 7A and 8 represent torque flows.

As illustrated in FIG. 6, it may be determined in Step S10 whether preconditions for the traveling mode setting control 1 are satisfied. For example, the preconditions for the traveling mode setting control 1 may include a condition that the control system 70 operates normally and a condition that the motor generator 60 is permitted to perform the regenerative operation. In a case where the control system operates normally and where the motor generator 60 is permitted to perform the regenerative operation, it may be determined that the preconditions are satisfied (Step S10: YES), and the procedure may proceed to Step S11.

In Step S11, it may be determined whether the vehicle 11 is coasting. For example, if it is determined in Step S11 that a driver's stepping operation on the accelerator pedal or the brake pedal is cancelled, the vehicle 11 may be determined to be coasting with gradual deceleration. If it is determined in Step S11 that the vehicle 11 is coasting (Step S11: YES), the procedure may proceed to Step S12. In Step S12, it may be determined whether the SOC of the battery 93 is greater than a predetermined threshold S1 (e.g., 95%).

If it is determined in Step S12 that the SOC of the battery 93 is greater than the threshold S1 (Step S12: YES), it is difficult for the motor generator 60 to perform energy regeneration. The procedure may thus proceed to Step S13. In Step S13, the motor stop mode may be executed to cause the motor generator 60 to stop rotating. For example, the control system 70 may bring the differential limiting clutch 26 into the released state, the rear clutch 65 into the released state, and the motor generator 60 into the rotation stop state, as illustrated in FIG. 7A. This causes the propeller shaft 16, the pinion 64, the bevel gear 63, and the rotor 60r to stop rotating while the vehicle 11 is coasting with gradual deceleration. In other words, the rotational resistance and the oil stirring resistance of the rear-wheel drive path 23 are reduced, which increases the coasting distance of the vehicle 11. Accordingly, it is possible to enhance the energy efficiency of the vehicle 11.

Further, by executing the motor stop mode while the vehicle 11 is coasting, the motor generator 60 may be stopped from rotating (as indicated by a reference sign A1 in FIG. 7B), and the rotation speed of the carrier C may be lowered (as indicated by an arrow A2 in FIG. 7B) while the vehicle speed is maintained. This lowers the rotation speed of the power transmission path 25 including the transmission mechanism 32. In other words, the rotational resistance and the oil stirring resistance of the power transmission path 25 are reduced, which increases the coasting distance of the vehicle 11. Accordingly, it is possible to enhance the energy efficiency of the vehicle 11. Further, as the motor generator 60 is brought into the rotation stop state, it is possible to avoid field-weakening control of the motor generator 60. Also from this perspective, it is possible to enhance the energy efficiency of the vehicle 11.

If it is determined in Step S12 of FIG. 6 that the SOC of the battery 93 is less than or equal to the threshold S1 (Step S12: NO), the motor generator 60 may be required to perform the energy regeneration. The procedure may thus proceed to Step S14. In Step S14, the front-wheel regeneration mode may be executed in which the front wheels are directly coupled to the motor generator 60. For example, the control system 70 may bring the differential limiting clutch 26 into the engaged state, the rear clutch 65 into the released state, and the motor generator 60 into the regenerative state, as illustrated in FIG. 8. This causes the motor generator 60 to actively perform the energy regeneration while the vehicle 11 is coasting with gradual deceleration. Accordingly, it is possible to enhance the energy efficiency of the vehicle 11. Note that, in the example illustrated in FIG. 8, the center differential 22 may transfer part of the power received from the front wheels 20 toward the engine 12.

Figure 9:
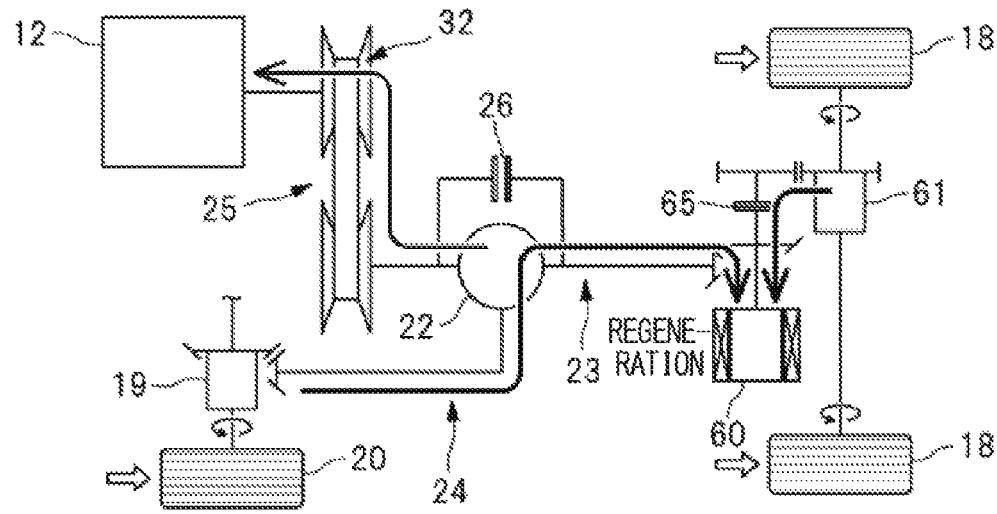
FIG. 9 is a diagram illustrating an exemplary condition in which the all-wheel regeneration mode is executed while the vehicle is coasting.

In the above description, the front-wheel regeneration mode is executed as the traveling mode when the SOC of the battery 93 is determined to be lower than or equal to the threshold S1 while the vehicle 11 is coasting; however, this example is not restrictive. Alternatively, the all-wheel regeneration mode may be executed when the SOC of the battery 93 is determined to be lower than or equal to the threshold S1 while the vehicle 11 is coasting. FIG. 9 illustrates an exemplary operational condition in which the all-wheel regeneration mode is executed while the vehicle 11 is coasting. Note that arrows in FIG. 9 represent torque flows.

If it is determined that the SOC of the battery 93 is less than or equal to the threshold S1 while the vehicle 11 is coasting (Step S12: NO), the all-wheel regeneration mode may be executed as the traveling mode, as illustrated in FIG. 9. For example, the control system 70 may bring the differential limiting clutch 26 into the released state, the rear clutch 65 into the engaged state, the motor generator 60 into the regenerative state, as illustrated in FIG. 9. This causes the braking force to be distributed to the front wheels 20 and the rear wheels 18 even when the motor generator 60 performs the energy regeneration while the vehicle 11 is coasting. Accordingly, it is possible to cause the vehicle 11 to keep traveling in a stable manner even on a skiddy road surface, such as a road covered with snow. Although the differential limiting clutch 26 is brought into the released state in the example illustrated in FIG. 9, this example is not restrictive. Alternatively, the differential limiting clutch 26 may be brought into the engaged state.

Traveling Mode Setting Control 2

Figure 10:
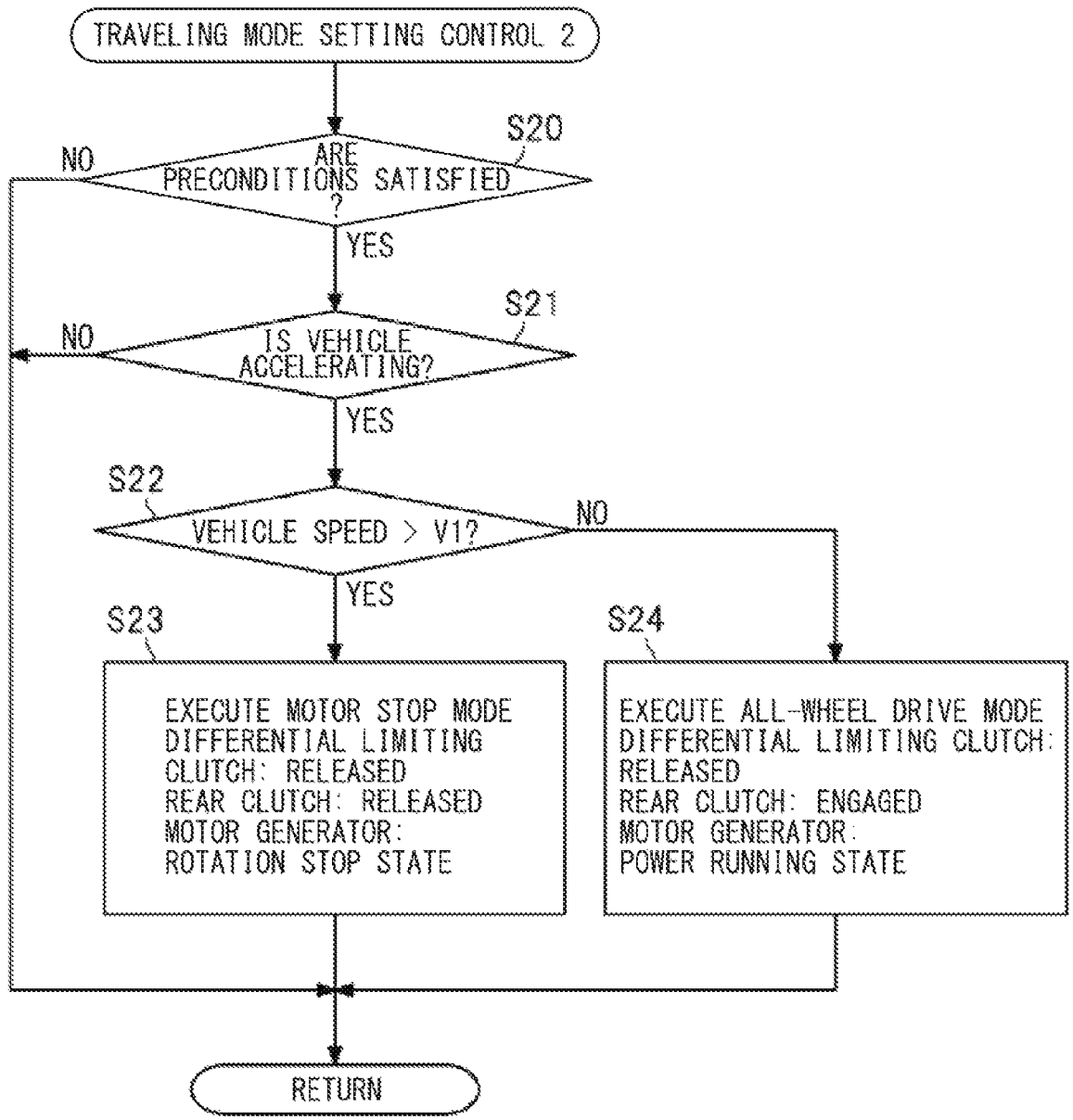
FIG. 10 is a flowchart illustrating an exemplary procedure for traveling mode setting control 2.
Figure 11A:
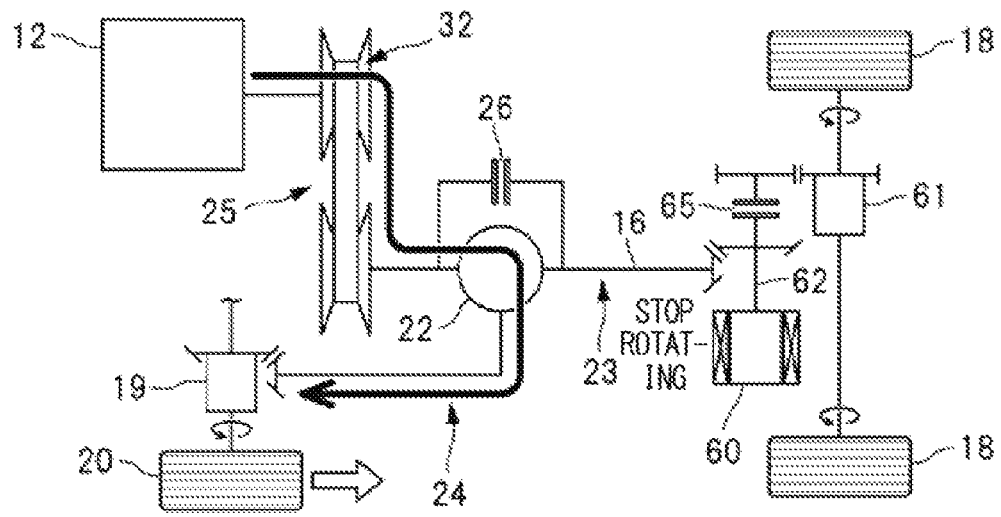
FIG. 11A is a diagram illustrating an exemplary condition in which the motor stop mode is executed while the vehicle is traveling at high speed.
Figure 11B:
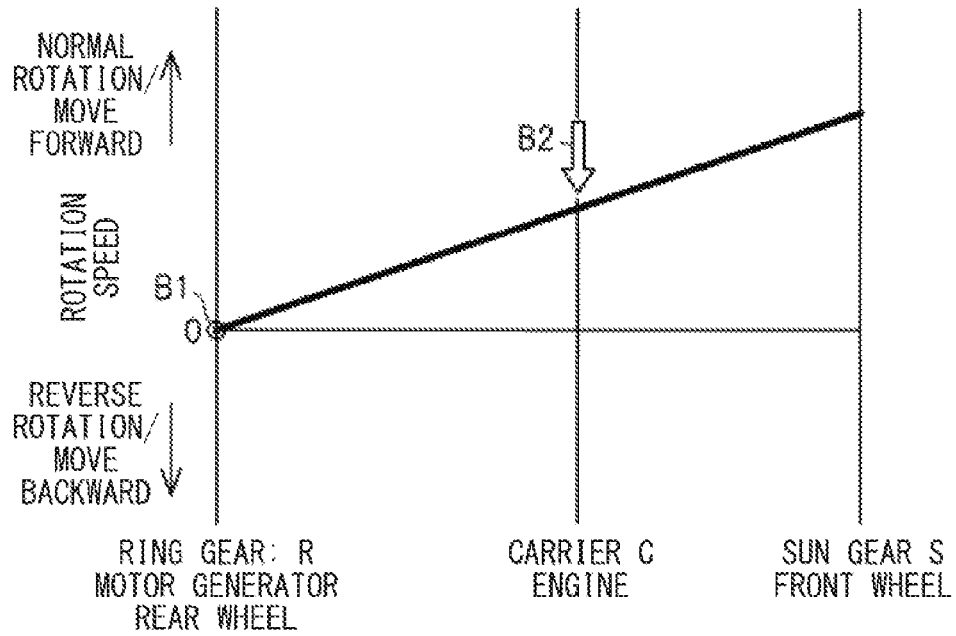
FIG. 11B is a nomographic chart illustrating an exemplary operational state of a center differential illustrated in FIG. 11A.
Figure 12:
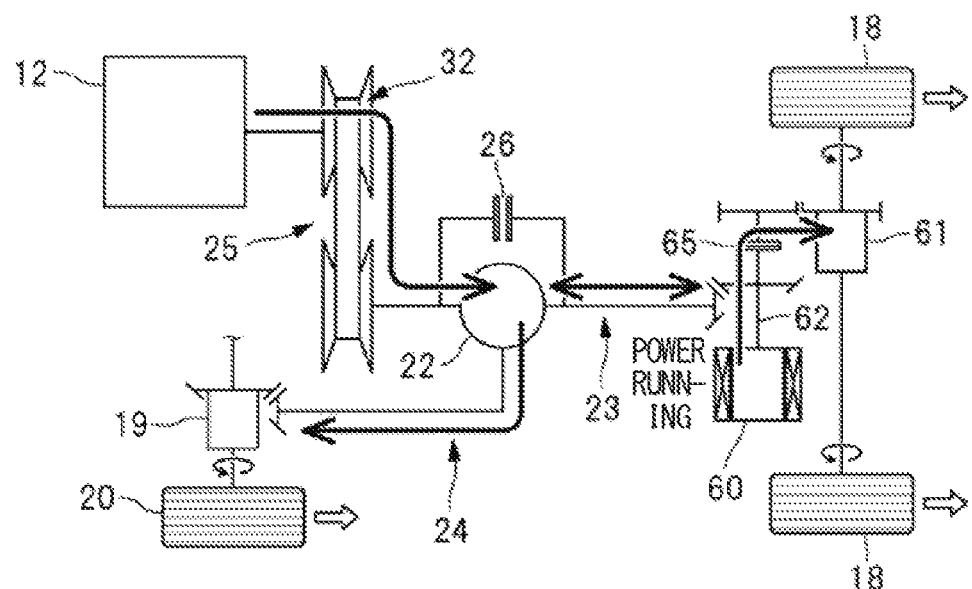
FIG. 12 is a diagram illustrating an exemplary condition in which the all-wheel drive mode is executed while the vehicle is traveling at a high speed.

Traveling mode setting control 2 will now be described. In the traveling mode setting control 2, a traveling mode in which the vehicle 11 is accelerated or caused to travel in a steady state may be set. FIG. 10 is a flowchart illustrating an exemplary procedure for the traveling mode setting control 2. The steps in the flowchart illustrated in FIG. 10 may be performed by the at least one processor 100 in the control system 70. The traveling mode setting control 2 illustrated in FIG. 10 may be a control process executed by the control system 70 at a predetermined cycle after the control system 70 including the VCU 75 is started in response to a driver's operation on the start switch 82. FIG. 11A illustrates an exemplary condition in which the motor stop mode is executed when the vehicle 11 travels at high speed, and FIG. 11B is a nomographic chart illustrating an exemplary operational state of the center differential 22 in FIG. 11A. FIG. 12 illustrates an exemplary condition in which the all-wheel drive mode is executed when the vehicle 11 travels at high speed. Note that arrows in the FIGS. 11A and 12 represent torque flows.

As illustrated in FIG. 10, it may be determined in Step S20 whether preconditions for the traveling mode setting control 2 are satisfied. For example, the preconditions for the traveling mode setting control 2 may include a condition that the control system 70 operates normally and a condition that the motor generator 60 is permitted to perform the power-running operation. In a case where the control system 70 operates normally and where the motor generator 60 is permitted to perform the power-running operation, it may be determined that the preconditions are satisfied (Step S20: YES), and the procedure may proceed to Step S21.

In Step S21, it may be determined whether the accelerator pedal is operated by the driver. If it is determined in Step S21 that the accelerator pedal is operated, i.e., if it is determined that the vehicle 11 is accelerating or traveling in a steady state (Step S21: YES), the procedure may proceed to Step S22. In Step S22, it may be determined whether the vehicle speed is higher than a predetermined threshold V1. If it is determined in Step S22 that the vehicle 11 is traveling at a high speed higher than the threshold V1 (Step S22: YES), the energy efficiency of the motor generator 60 is likely to decrease. The procedure may thus proceed to Step 23. In Step S23, the motor stop mode may be executed to cause the motor generator 60 stop rotating.

For example, the control system 70 may bring the differential limiting clutch 26 into the released state, the rear clutch 65 into the released state, and the motor generator 60 into the rotation stop state, as illustrated in FIG. 11A. This causes the motor generator 60 to stop rotating while the vehicle 11 is traveling at a high speed higher than the threshold V1, avoiding field-weakening control of the motor generator 60 for keeping high speed rotation. The energy loss of the motor generator 60 is thereby reduced. Accordingly, it is possible to enhance the energy efficiency of the vehicle 11. Additionally, the propeller shaft 16, the pinion 64, the bevel gear 63, and the rotor 60r are stopped from rotating while the vehicle 11 is traveling at a high speed higher than the threshold V1. In other words, the rotational resistance and the oil stirring resistance of the rear-wheel drive path 23 are reduced. Accordingly, it is possible to enhance the energy efficiency of the vehicle 11 during high-speed traveling.

Further, by executing the motor stop mode while the vehicle 11 is traveling at high speed, the motor generator 60 may be stopped from rotating (as indicated by a reference sign B1 in FIG. 11B), and the rotation speed of the carrier C may be lowered (as indicated by an arrow B2 in FIG. 11B) while the vehicle speed is maintained. This lowers the rotation speed of the power transmission path 25 including the transmission mechanism 32. In other words, the rotational resistance and the oil stirring resistance of the power transmission path 25 are reduced. Accordingly, it is possible to enhance the energy efficiency of the vehicle 11 during high-speed traveling.

If it is determined in Step S22 of FIG. 10 that the vehicle speed is lower than or equal to the threshold V1 (Step S22: NO), the energy efficiency of the motor generator 60 is not largely decreased. The procedure may thus proceed to Step S24. In Step S24, the all-wheel drive mode may be executed in which both the front wheels 20 and the rear wheels 18 are driven. For example, the control system 70 may bring the differential limiting clutch 26 into the released state, the rear clutch 65 into the engaged state, and the motor generator 60 into the power-running state, as illustrated in FIG. 12. This causes the driving power to be distributed to both the front wheels 20 and the rear wheels 18. Accordingly, it is possible to cause the vehicle 11 to keep traveling in a stable manner even on a skiddy road surface, such as a road covered with snow.

In the example illustrated in FIG. 12, the differential limiting clutch 26 is brought into the released state; however, this example is not restrictive. Alternatively, the differential limiting clutch 26 may be brought into the engaged state. Further, in the example illustrated in FIG. 12, the motor generator 60 is brought into the power-running state; however, this example is not restrictive. For example, when the engine 12 produces large torque, when the accelerator position is small, or when the SOC is low, the motor generator 60 may be brought into the regenerative state even while the all-wheel drive mode is executed in which the vehicle 11 is accelerated or caused to travel in a steady state.

Traveling Mode Switching Control

Figure 13:
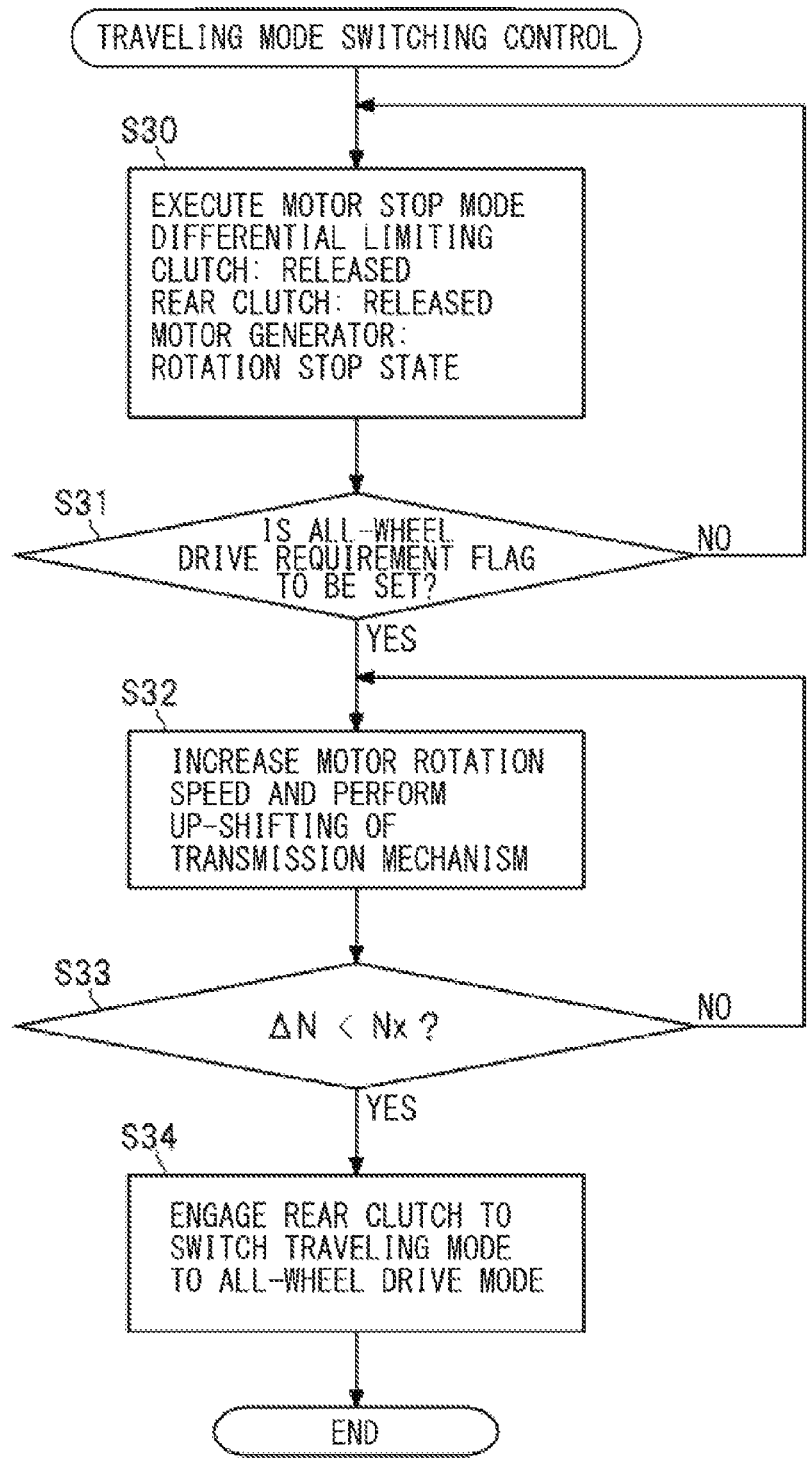
FIG. 13 is a flowchart illustrating an exemplary procedure for traveling mode switching control.
Figure 14A:
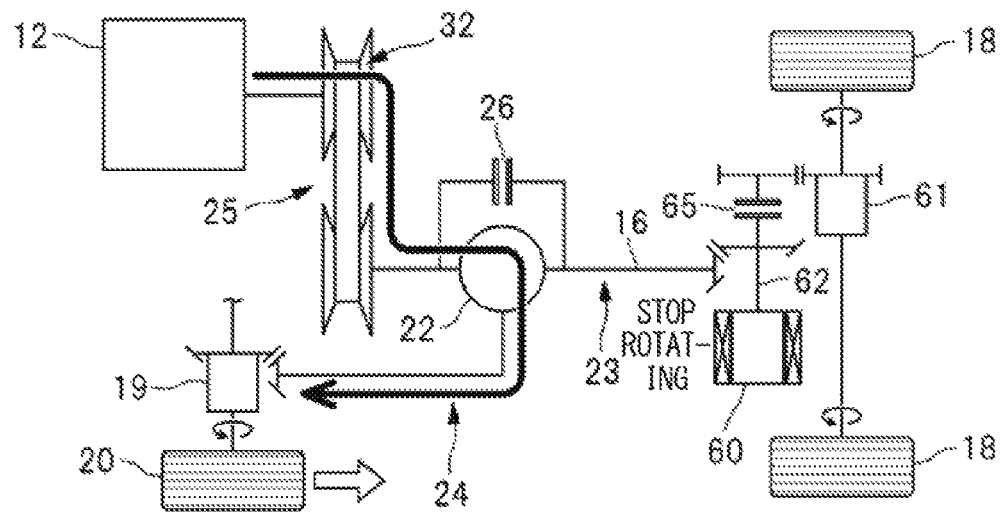
FIG. 14A is a diagram illustrating an exemplary condition in which the motor stop mode is executed.
Figure 14B:
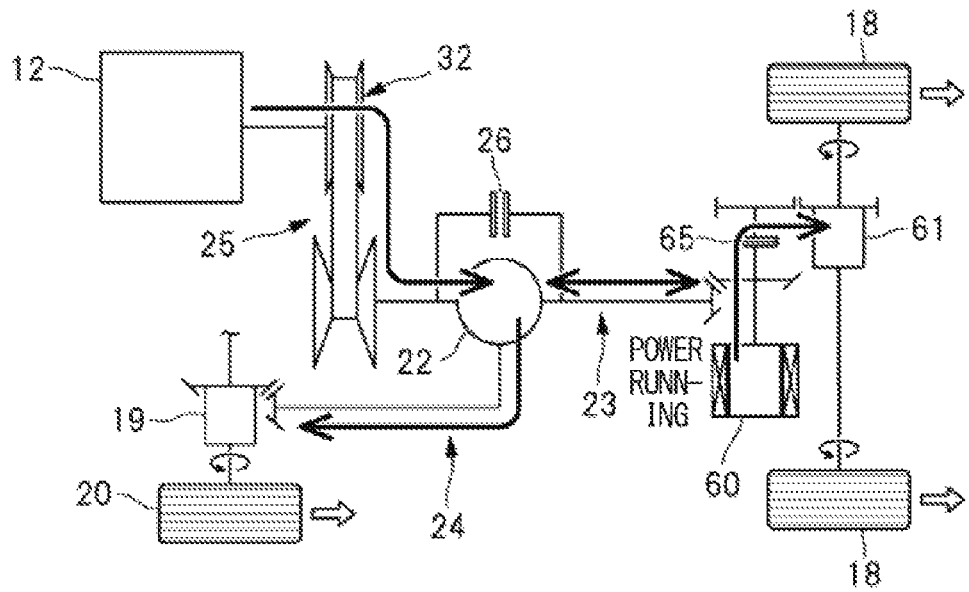
FIG. 14B is a diagram illustrating an exemplary condition in which the all-wheel drive mode is executed.
Figure 15:
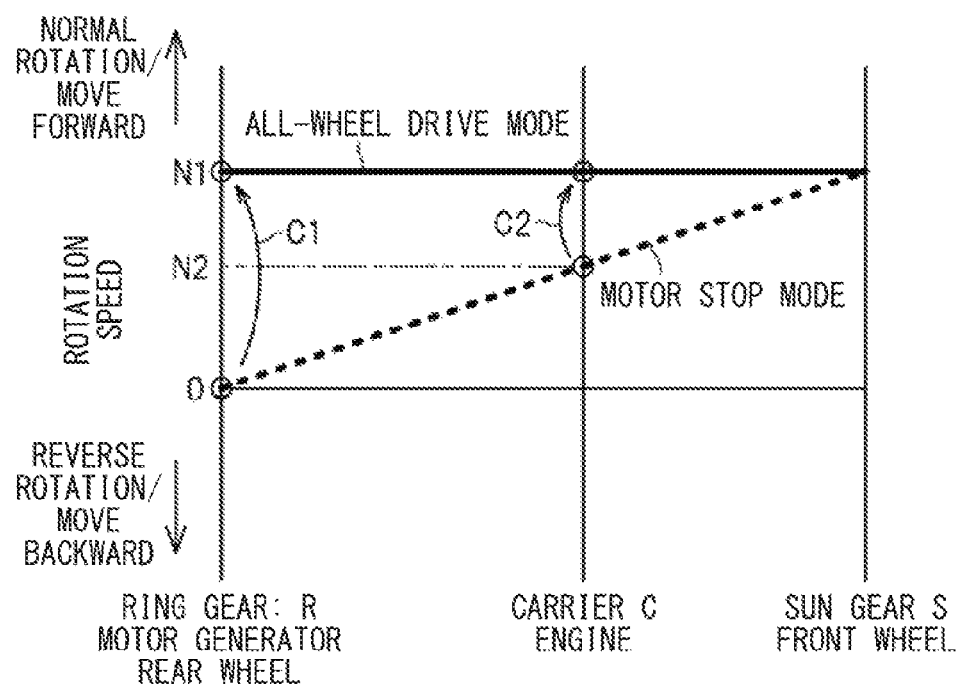
FIG. 15 is a nomographic chart illustrating an exemplary change in the operational state of the center differential during the traveling mode switching control.

Traveling mode switching control will now be described. In the traveling mode switching control, the traveling mode may be switched from the motor stop mode to the all-wheel drive mode. FIG. 13 is a flowchart illustrating an exemplary procedure for the traveling mode switching control. The steps in the flowchart illustrated in FIG. 13 may be performed by the at least one processor 100 in the control system 70. The traveling mode switching control illustrated in FIG. 13 may be a control process executed by the control system 70 while the motor stop mode is executed. FIG. 14A illustrates an exemplary condition in which the motor stop mode is executed, and FIG. 14B illustrates an exemplary condition in which the all-wheel drive mode is executed. FIG. 15 is a nomographic chart illustrating an exemplary change in the operational state of the center differential 22 during the traveling mode switching control. Note that arrows in FIGS. 14A and 14B represent torque flows.

As illustrated in FIG. 13, the motor stop mode may be executed as the traveling mode in Step S30. For example, the control system 70 may bring the differential limiting clutch 26 into the released state, the rear clutch 65 into the released state, and the motor generator 60 into the rotation stop state, as illustrated in FIG. 14A. Thereafter, in Step S31 of FIG. 13, it may be determined whether an all-wheel drive requirement flag is to be set on the basis of the driving condition or the traveling state, for example.

The all-wheel drive requirement flag may be a flag to be set for switching the traveling mode from the motor stop mode to the all-wheel drive mode. For example, in a case where the accelerator position is greater than a predetermined threshold position, where the steering wheel angle is greater than a predetermined threshold angle, or where the slip ratio of each wheel is greater than a predetermined threshold ratio, the all-wheel drive requirement flag may be set to stabilize the travel of the vehicle 11. In contrast, in a case where the accelerator position is less than or equal to the predetermined threshold position, where the steering wheel angle is less than or equal to the predetermined threshold angle, and where the slip ratio of each wheel is less than or equal to the predetermined threshold ratio, the all-wheel drive requirement flag may be cancelled as the travel of the vehicle 11 has been stabilized.

If it is determined in Step S31 that the all-wheel drive requirement flag is to be set (Step S31: YES), the procedure may proceed to Step S32. In Step S32, the switching from the motor stop mode to the all-wheel drive mode may start. As illustrated in FIGS. 14A and 14B, it may be necessary to switch the rear clutch 65 from the released state to the engaged state in order to switch the traveling mode from the motor stop mode to the all-wheel drive mode. Thus, it may be necessary to rotate the propeller shaft 16 and the rotor shaft 62 having been stopped by bringing the motor generator 60 into the power-running state in order to cancel the difference in rotation speed between a front portion and a rear portion of the rear clutch 65. For example, as illustrated in FIG. 15, when the rotation speed of the sun gear S is a rotation speed N1 while the vehicle 11 is traveling, the motor rotation speed needs to be increased until the rotation speed of the ring gear R reaches the rotation speed N1, as indicated by an arrow C1. Note that, in the example illustrated in FIG. 15, the gear ratio of the front-wheel drive path 24 and the gear ratio of the rear-wheel drive path 23 may be equal to each other. That is, the rotation speed of the front wheels 20 and the rotation speed of the rear wheels 18 may be equal to each other when the rotation speed of the ring gear R and the rotation speed of the sun gear S are equal to each other.

When the motor rotation speed is increased as described above, the rotation speed of the carrier C may be increased by the motor generator 60 as indicated by an arrow C2 in FIG. 15, and the rotation speed of the crankshaft 33 (hereinafter referred to as an engine rotation speed) may also be increased via the power transmission path 25. However, an excessive change in the engine rotation speed at the time of switching of the traveling mode can make the driver feel strange. To address such a concern, the control system 70 may increase the motor rotation speed and perform up-shifting of the transmission mechanism 32 in Step S32 of FIG. 13. Thereafter, in Step S33, it may be determined whether the difference ΔN in rotation speed between the front portion and the rear portion of the rear clutch 65 is less than a predetermined threshold Nx (e.g., 100 rpm). If it is determined in Step S33 that the difference ΔN in rotation speed is less than the threshold Nx (Step S33: YES), it may be determined that the difference in rotation speed between the front portion and the rear portion of the rear clutch 65 has been cancelled, and the procedure may proceed to Step S34. In Step S34, the rear clutch 65 may be brought into the engaged state, and the switching from the motor stop mode to the all-wheel drive mode may be completed. Note that the difference ΔN in rotation speed between the front portion and the rear portion of the rear clutch 65 may be defined as the difference in rotation speed between the rotor shaft 62 and the driving gear 66.

Figure 16A:
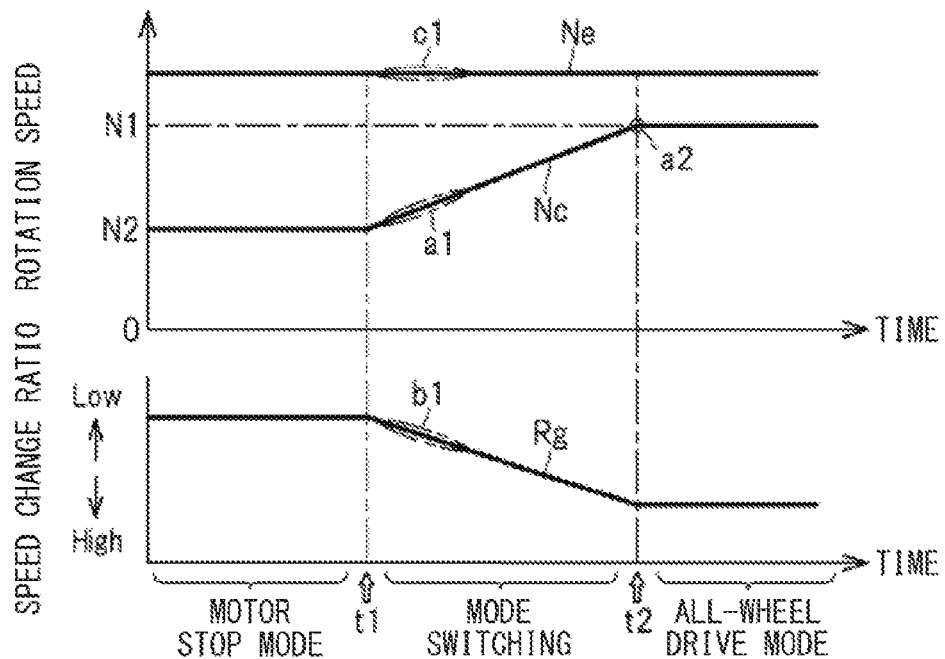
FIG. 16A is a timing chart illustrating an exemplary condition in which the traveling mode switching control according to one example embodiment is executed.
Figure 16B:
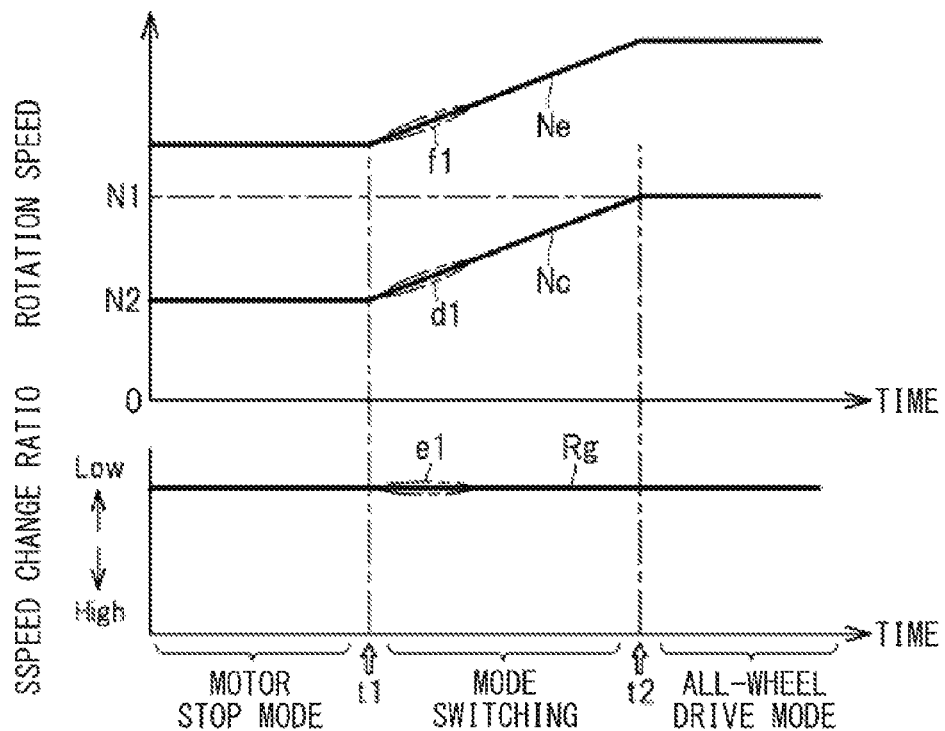
FIG. 16B is a timing chart illustrating traveling mode switching control according to a comparative example is executed.

FIG. 16A is a timing chart illustrating an exemplary condition in which the traveling mode switching control according to the example embodiment is executed. FIG. 16B is a timing chart illustrating an exemplary condition in which the traveling mode switching control according to a comparative example is executed. In FIGS. 16A and 16B, a reference sign "Ne" represents the engine rotation speed, a reference sign "Nc" represents the rotation speed of the carrier C changing with the motor rotation speed, and a reference sign "Rg" represents the speed change ratio of the transmission mechanism 32.

When the switching from the motor stop mode to the all-wheel drive mode starts at time t1 in the example embodiment illustrated in FIG. 16A, the rotation speed Nc of the carrier C may increase from a rotation speed N2 toward a rotation speed N1 with an increase in the motor rotation speed, as indicated by a reference sign a1. At this time, the up-shifting of the transmission mechanism 32 may be performed, causing the speed change ratio Rg of the transmission mechanism 32 to change toward a high side, as indicated by a reference sign b1. The up-shifting of the transmission mechanism 32 performed as described above suppresses an increase in the engine rotation speed Ne in association with an increase in the rotation speed of the carrier C, as indicated by a reference sign c1. Thereafter, when the rotation speed Nc of the carrier C reaches the rotation speed N1 at time t2 as indicated by a reference sign a2, the difference in rotation speed between the front portion and the rear portion of the rear clutch 65 may be cancelled. The rear clutch 65 may be thereby engaged, and the switching to the all-wheel drive mode may be completed. The up-shifting of the transmission mechanism 32 performed as described above suppresses an excessive increase in the engine rotation speed Ne and enables the traveling mode switching without making the driver feel strange. Although the engine rotation speed Ne is maintained constant in the example illustrated in FIG. 16A, this example is not restrictive. The engine rotation speed Ne may be increased or decreased within such a range that does not make the driver feel strange.

In contrast, when the switching from the motor stop mode to the all-wheel drive mode starts at the time t1 in the comparative example illustrated in FIG. 16B, the rotation speed Nc of the carrier C increases from the rotation speed N2 toward the rotation speed N1, as indicated by a reference sign d1. As the speed change ratio Rg of the transmission mechanism 32 is maintained at this time as indicated by a reference sign e1, the engine rotation speed Ne increases with an increase in the rotation speed of the carrier C, as indicated by a reference sign f1. The engine rotation speed Ne keeps increasing until the rotation speed Nc of the carrier C reaches the rotation speed N1. As the speed change ratio Rg of the transmission mechanism 32 is maintained as described above, an excessive increase can be caused in the engine rotation speed Ne, making the driver feel strange. In contrast, the up-shifting of the transmission mechanism 32 is performed in the example embodiment to suppress the excessive increase in the engine rotation speed Ne, as illustrated in FIG. 16A.

It should be understood that the technology is not limited to the foregoing example embodiments and may be modified in various ways without departing from the gist of the technology. Although the control system 70 includes the control units 71 to 75 in the foregoing example embodiments, these examples are not restrictive. In another example embodiment, the control system 70 may include a single control unit. Further, although the transmission mechanism 32 is a continuously variable transmission in the foregoing example embodiments, these examples are not restrictive. In another example embodiments, the transmission mechanism 32 may be a planetary gear automatic transmission. Still further, although the ring gear R and the sun gear S are respectively coupled to the rear wheel 18 and the front wheel 20 in the foregoing example embodiments, these examples are not restrictive. In another example embodiment, the ring gear R and the sun gear S may be respectively coupled to the front wheel 20 and the rear wheel 18. In other words, although the ring gear R and the sun gear S are respectively used as the first rotation element and the second rotation element in the foregoing example embodiments, these examples are not restrictive. In another example embodiment, the sun gear S and the ring gear R may be respectively used as the first rotation element and the second rotation element. Furthermore, although the planetary gear mechanism 21 is a single-pinion planetary gear mechanism in the examples illustrated in the drawings, these examples are not restrictive. In another example embodiment, the planetary gear mechanism 21 may be a planetary gear mechanism of a different type. Even when the planetary gear mechanism of a different type is used, the rotation elements provided at the respective ends of the nomographic chart may be used as the first rotation element and the second rotation element.

Although the differential limiting clutch 26 and the rear clutch 65 are hydraulic clutches in the foregoing example embodiments, these examples are not restrictive. In another example embodiment, the differential limiting clutch 26 and the rear clutch 65 may be controlled by electric actuators. Further, although the differential limiting clutch 26 and the rear clutch 65 are friction clutches in the foregoing example embodiments, these examples are not restrictive. In another example embodiment, the differential limiting clutch 26 and the rear clutch 65 may be claw clutches. Still further, although the differential limiting clutch 26 engages the ring gear R and the carrier C with each other in the foregoing example embodiments, these examples are not restrictive. In another example embodiment, at least two of the ring gear R, the carrier C, and the sun gear S may be engaged with each other.

Although the rear wheel 18 and the front wheel 20 are respectively used as the first wheel and the second wheel in the foregoing example embodiments, these example are not restrictive. In another example embodiment, the front wheel 20 and the rear wheel 18 may be respectively used as the first wheel and the second wheel. In this case, the front wheel 20 may be separated from the motor generator 60 or the engine 12 in the motor stop mode. Further, although the motor stop mode is executed when the SOC of the battery 93 is greater than the threshold S1 while the vehicle 11 is coasting in the process illustrated in the flowchart of FIG. 6, this example is not restrictive. In another example embodiment, the differential limiting clutch 26 and the rear clutch 65 may be released and the motor stop mode in which the motor generator 60 is brought into the rotation stop state may be executed when the SOC of the battery 93 is less than or equal to the threshold S1 while the vehicle 11 is decelerated by the stepping operation of the brake pedal.

The invention claimed is:

1. A vehicle control apparatus, the vehicle control apparatus being configured to control a vehicle and comprising:
    a planetary gear mechanism including a first rotation element, a second rotation element, and a third rotation element;
    a first wheel coupled to the first rotation element via a first path;
    a second wheel coupled to the second rotation element via a second path;
    an engine coupled to the third rotation element via a third path;
    a motor generator provided on the first path;
    a wheel drive clutch provided on the first path and between the motor generator and the first wheel; and
    a control system including a processor and a memory communicably coupled to each other, the control system being configured to control the motor generator and the wheel drive clutch, wherein
    the control system is configured to execute a motor stop mode in which the wheel drive clutch is brought into a released state and the motor generator is brought into a rotation stop state.

2. The vehicle control apparatus according to claim 1, further comprising
    a power storage device coupled to the motor generator, wherein
    the control system is configured to execute the motor stop mode in a case where a state of charge of the power storage device is greater than a threshold state of charge while the vehicle is decelerating.

3. The vehicle control apparatus according to claim 2, further comprising
    a differential limiting clutch configured to engage at least two of the first rotation element, the second rotation element, and the third rotation element, wherein
    the control system is further configured to execute a motor regeneration mode in which the differential limiting clutch is brought into a first engaged state, the wheel drive clutch is brought into the released state, and the motor generator is brought into a regenerative state, and
    the control system is configured to execute the motor regeneration mode when the state of charge of the power storage device is less than or equal to the threshold state of charge while the vehicle is decelerating.

4. The vehicle control apparatus according to claim 1, wherein the control system is configured to execute the motor stop mode in a case where a vehicle speed of the vehicle is greater than a threshold speed.

5. The vehicle control apparatus according to claim 1, further comprising
    a transmission mechanism provided on the third path, wherein
    the control system is configured to execute an all-wheel drive mode in which the wheel drive clutch is brought into a second engaged state and the motor generator is brought into a power-running state, and
    the control system is configured to execute up-shifting of the transmission mechanism upon making a switch from the motor stop mode to the all-wheel drive mode.

* * * * *